Feb. 26, 1935.          J. H. VICTOR ET AL          1,992,790
                            GREASE RETAINER
                         Filed Jan. 20, 1933
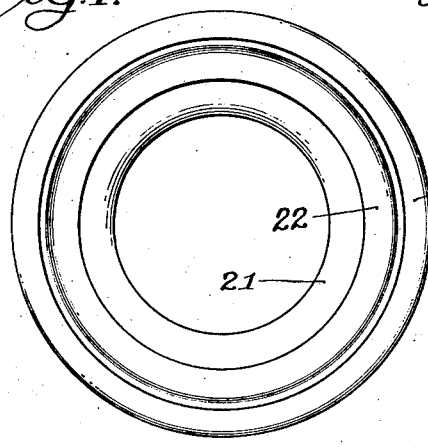
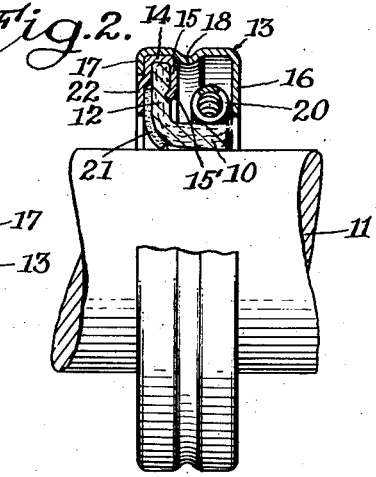
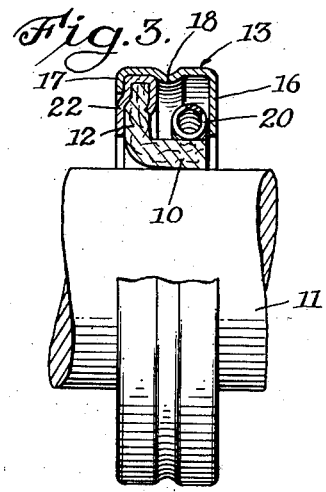
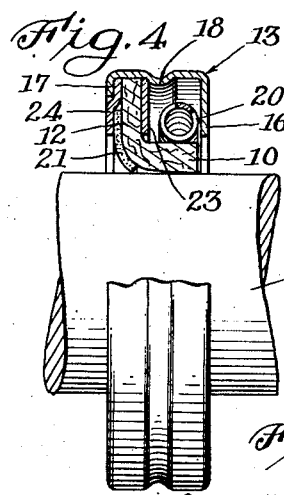
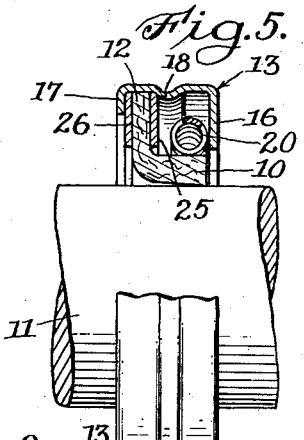
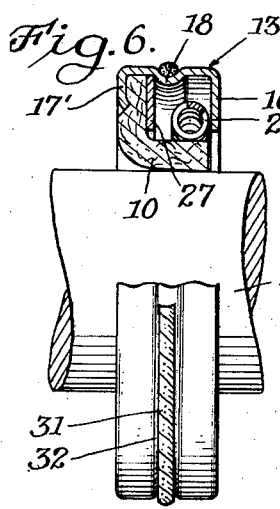
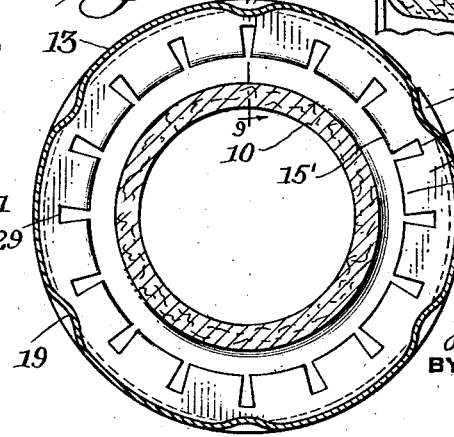
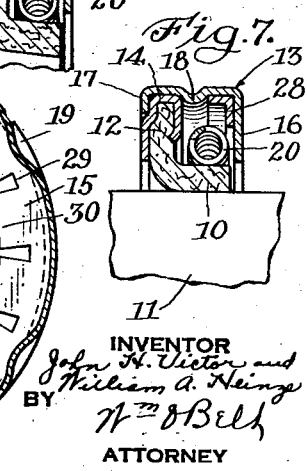
INVENTOR
John H. Victor and
William A. Heinz
BY
Wm. D. Bell
ATTORNEY Patented Feb. 26, 1935

1,992,790

UNITED STATES PATENT OFFICE 1,992,790

GREASE RETAINER

John H. Victor, Evanston, and William A. Heinze, Chicago, Ill., assignors to Victor Manufacturing & Gasket Company, Chicago, Ill., a corporation of Illinois Application January 20, 1933, Serial No. 652,662

4 Claims. (Cl. 288—1)

This invention relates to grease retainers and it has for its object to provide a novel and simple device which will effectively prevent the escape thereby of grease or oil in any installation in which it may be used. A particular use of the invention is to form a seal about the rear axle of an automobile and it may be used in many other installations where a seal against the escape of grease or oil is desired.

Another object of the invention is to provide a seal about the outer edge of a leather packing in the retainer by armoring said edge with a metal binding which will fit snugly and tightly in the retainer shell and prevent the escape of grease or oil thereby.

In the accompanying drawing we have illustrated selected embodiments of the invention and referring thereto:

Fig. 1 is a side view of the retainer.

Fig. 2 shows the retainer applied to a section of a shaft and partly broken away and in section.

Figs. 3 to 6 are views similar to Fig. 2 showing different forms of the invention.

Fig. 7 is a detail sectional view showing the shell provided with a reenforce.

Fig. 8 is a sectional view through a retainer having indentations instead of the peripheral rib as shown in Figs. 1 to 7, and Fig. 9 is a detail sectional view on the line 9—9 of Fig. 8.

Referring to the drawing, the packing preferably comprises a ring made of leather or other suitable material having a tubular portion 10 to engage a shaft 11 and a radial portion 12 which is securely held against rotation in the shell 13. The peripheral edge of the packing is armored with a binding 14 which is preferably made of metal in the form of a ring having an annular groove opening inwardly to receive the peripheral edge of the packing. The armor binding is pressed upon the packing to hold it snugly and tightly not only to prevent the passage of grease or oil between the edge of the packing and the binding but also to prevent the packing from moving rotatively in the binding, and the inner side 15 of the binding ring may have its inner edge 15' bent inwardly into the packing to rigidly secure the armor binding on the packing. In the embodiments of the invention illustrated in the drawing the shell 13 has a comparatively wide side 16 and an inwardly directed flange or narrow side 17. The rim of the shell is provided with an inwardly projecting annular rib 18, Figs. 1 to 6, or with spaced projections 19, Fig. 8. The armored edge of the packing is securely held between the rib 18 and the flange 17 or between the projections 19 and the flange 17. We prefer to assemble the armored packing in the shell with a drive fit against the rib 18 or projections 19 and then spin the flange 17 over upon the armored edge of the packing and thereby secure the packing snugly and tightly and non-rotatively in the shell. A coil spring 20 is arranged about the tubular portion 10 of the packing and is enclosed within the shell and retained therein by the side 16 of the shell. This spring holds the tubular portion of the packing snugly engaged with the shaft 11 to prevent the passage of grease or oil. A reenforce ring or washer 21 may be secured by the armor binding against the outer side of the radial portion 12 of the packing and extending over that portion of the packing where the radial portion merges with the tubular portion, and for this purpose the outer side 22 of the armor binding may be offset as shown in Figs. 2 and 4 to accommodate the reenforce 21 and so that the outer surface of the flange and of the exposed part of the armor binding will be flush to make a smooth side surface for the retainer. The reenforce ring is preferably made of strong, tough paper having a manila rope paper base treated to make it water, grease and oil proof but it may be made of other suitable materials.

In Fig. 3 the packing reenforce 21 is omitted. In Fig. 4 the armor binding is formed by an inner ring 23 and an outer ring 24 between which the packing and the reenforce are held. These packing ring parts being assembled they are driven in the shell against the annular rib 18 and the flange is spun over upon the ring 24 to hold the packing ring assembly snugly and tightly in the shell and against relative rotative movement. In Fig. 5 the reenforce 21 is omitted and the armor binding is formed by two flat rings 25, 26 which are secured in the shell with the packing ring as heretofore described. In Fig. 6 the peripheral edge of the packing ring is armored by a metal ring 27 which engages the annular rib 18 and by the rim of the shell and the flange side 17' of the shell, the inner edge of the flange being bent inwardly into the packing to securely hold it in the shell. It may be found desirable to reenforce the shell against the blows which may be employed in driving the retainer into a housing, especially if the shell is made of thin metal and if the retainers are of large size, for use in heavy trucks for example, and for this purpose we provide an angle shaped metal ring 28 (Fig. 7) which is arranged in the spring chamber of the shell and fitted in the corner between the side 16 and the rim of the shell. The reenforce ring 28 is inserted in the shell, whenever it is required, before the rib 18 and the flange 17 are formed, and it is preferably inserted with a press fit so that it will be held snugly and tightly in the shell and against relative rotation. We may make the inner side 15 of the armor binding and its inner edge 15' continuous but for some purposes, and especially if heavy gage metal is employed for the armor, we prefer to provide the inner side 15 with radial slits 29 extending through the inner edge 15' and dividing the inner marginal edge into lips 30 which can be more easily bent into engagement with the packing, Figs. 8, 9; and besides these slits and lips form a discontinuous edge which will bite the packing and hold it more securely against rotative movement in the armor than if the edge 15' is continuous.

The shell is made to size to be pressed or driven into a housing or other part and form a grease and oil seal between the shell and the housing, but there may be instances where the opening in the housing is oversize and, to make the retainer act as a seal, a packing cord 31, Fig. 6, may be secured in the groove 32 formed in the outer wall of the rim by the indented rib 18. This packing cord can be applied as a standard part of the retainer, or it may be applied on the job, and it will assist in forming a tight seal between the retainer and the housing.

The invention provides a retainer of simple construction comprising but few parts securely held together in a strong substantial unit adapted for immediate installation to prevent the escape of grease or oil. It is important to protect the peripheral marginal edge of the packing ring with a metal armor providing metal to metal contact with the shell and affording additional protection against the escape of grease and oil, and for this purpose it is preferred to enclose the peripheral marginal edge of the packing within the armor binding although the construction of Figs. 4 and 5 will be found entirely sufficient for some purposes. The rib 18 or the spaced projections 19 form a seat for the packing ring between which and the flange 17 the ring is securely held against movement relative to the shell.

We do not limit the invention to the specific disclosures in the foregoing description and drawing but reserve the right to make any changes in the form, construction and arrangement of parts as may be necessary or desirable for the many purposes for which grease retainers are employed and within the scope of the following claims.

We claim:

1. A grease retainer comprising a packing ring having a tubular portion to receive a shaft and a radially extending portion, an armor binding about the marginal edge of the radial portion of the packing, a shell surrounding the packing, and means securing the packing in the shell and against relative rotation, said means comprising an annular bead in the shell.

2. A grease retainer comprising a shell, a packing ring secured in the shell and having a tubular portion to receive a shaft and a radially extending portion, an armor binding on the marginal edge of the radially extending portion of the packing, and a reenforce ring secured by the armor binding to the outer side of the packing in reenforcing relation to that part of the packing where the tubular portion and the radial portion thereof merge.

3. A grease retainer comprising a shell having a rim, a side at one edge of the rim, a flange at the other edge of the rim, a packing ring having a tubular portion to receive a shaft and a radially extending portion, the marginal edge of the radial portion of the packing having an armor binding thereon, and means for securing the armored edge of the packing in the shell in engagement with the rim and said flange, the outer side of said armor binding extending inwardly over the radial portion of the packing beyond the flange on the shell and being offset to receive the flange so that said extended inner side of the armor binding will be flush with the flange.

4. A grease retainer comprising a shell, a packing ring secured in the shell and having a tubular portion to receive a shaft and a radially extending portion, and an armor binding on the marginal edge of the radially extending portion of the packing, one marginal edge of said armor binding being radially slitted and providing intermediate lips which are bent inwardly and embedded in the packing to secure the binding rigidly on the packing.

JOHN H. VICTOR.
WILLIAM A. HEINZE.